United States Patent [19]
Wiater

[11] 3,960,250
[45] June 1, 1976

[54] SKIRTED DASHPOT PISTON

[75] Inventor: Kenneth Walter Wiater, Palatine, Ill.

[73] Assignee: Teletype Corporation, Skokie, Ill.

[22] Filed: Apr. 14, 1975

[21] Appl. No.: 567,976

[52] U.S. Cl. .............. 188/281; 188/284; 188/321; 197/183
[51] Int. Cl.² .......................... F16F 9/48
[58] Field of Search .......... 188/281, 284, 286, 321, 188/322; 16/66, 84; 92/240, 245; 197/183

[56] References Cited
UNITED STATES PATENTS

| | | | |
|---|---|---|---|
| 329,298 | 10/1885 | Elliott | 16/84 |
| 478,388 | 7/1892 | Wright | 197/183 |
| 565,377 | 8/1896 | Brunthaver | 16/66 |
| 671,559 | 4/1901 | Lindstrom | 188/284 |
| 2,702,398 | 2/1955 | Marcus | 16/66 |
| 2,884,291 | 4/1959 | Whitten | 92/240 |
| 3,163,261 | 12/1964 | Sim | 188/321 |
| 3,318,202 | 5/1967 | Means | 92/245 |

FOREIGN PATENTS OR APPLICATIONS
261,832  1/1970  U.S.S.R. .......................... 284/

Primary Examiner—Stephen G. Kunin
Assistant Examiner—Edward R. Kazenske
Attorney, Agent, or Firm—W. G. Dosse; W. K. Serp; J. L. Landis

[57] ABSTRACT

An improved decelerating mechanism of the dashpot type in which the piston normally leaves the cylinder on each operating cycle and has a sealing ring cantilevered in the direction of piston travel having a deep undercut whereby air pressure of the air compressed in front of the piston inside the cylinder biases the cantilevered sealing ring against the wall of the cylinder to accomplish effective sealing of the piston against uncontrolled air leakage. A projection on the front of the piston seals the air exit from the compression chamber during the last portion of piston travel in order to provide a final cushion for the moving dashpot piston.

2 Claims, 3 Drawing Figures

SKIRTED DASHPOT PISTON

FIELD OF THE INVENTION

The present invention relates to dashpots or decelerating devices and particularly to sealing of the dashpot piston within the dashpot cylinder.

BACKGROUND OF THE INVENTION

U.S. Pat. No. 3,163,261, granted to G. Sim on Dec. 29, 1964, discloses a decelerating device for a teleprinter carriage in which during most of the carriage travel the piston of the dashpot is outside of the cylinder of the dashpot. The piston is mounted to the carriage on a spring-biased friction structure in order to permit a camming surface on the dashpot cylinder to mate with a camming surface on the piston to center the axis of the piston with respect to the axis of the dashpot cylinder each time that the carriage is returned to the left margin.

Briefly, a typical teleprinter carriage is advanced from left to right across the platen and at the end of the line the carriage is returned to the left margin generally under the control of a simple spring. Under this type of control, the carriage continues to accelerate as it moves to the left and develops a rather high velocity at the terminal end of the return travel. To prevent excessive impact and damage to parts, a dashpot structure is often provided to slow the carriage as it approaches the left margin and the dashpot cylinder of the Sim patent has a central opening the size of which can be controlled by a spring-loaded cover so as to control the release of air pressure within the cylinder and thus the amount of damping generated by the piston as it moves through the cylinder.

A certain amount of clearance is necessary between the piston and the cylinder in order to accommodate manufacturing tolerances. The amount of necessary clearance coupled with the necessarily loose mounting of the piston on the carriage will permit the adverse relative orientation which can occasionally result in binding of the piston within the cylinder. This can result in loss of left-hand margin control.

Bicycle pumps have long been known in which the pistons contain flaps that are pressed against the cylinder walls by the air pressure within the compression chamber. However, such a piston is specifically intended never to leave the cylinder, much less normally enter the cylinder on each cycle of pump operation. If such a pump is disassembled, it takes a bit of work to reinsert the piston with the flap whole and properly oriented.

Therefore, it is an object of the present invention better to seal a dashpot piston.

It is another object of the present invention to seal a dashpot piston in such a manner as to permit self-centering of the piston and self-alignment and positioning of the sealing member.

It is still another object of the invention to provide a piston and cylinder structure with wide spacing between the cylinder and piston which can be accommodated by a relatively flexible seal and to provide such seal.

SUMMARY OF THE INVENTION

In accordance with the present invention as defined only in the accompanying claims, a dashpot cylinder has a camming surface at its entrance to allow entry of a piston containing a sealing ring which is exceedingly flexible in the sealing direction and which is biased into the sealing direction by fluid pressure compression in front of the piston as it moves through the cylinder.

DETAILED DESCRIPTION

Figure 1:
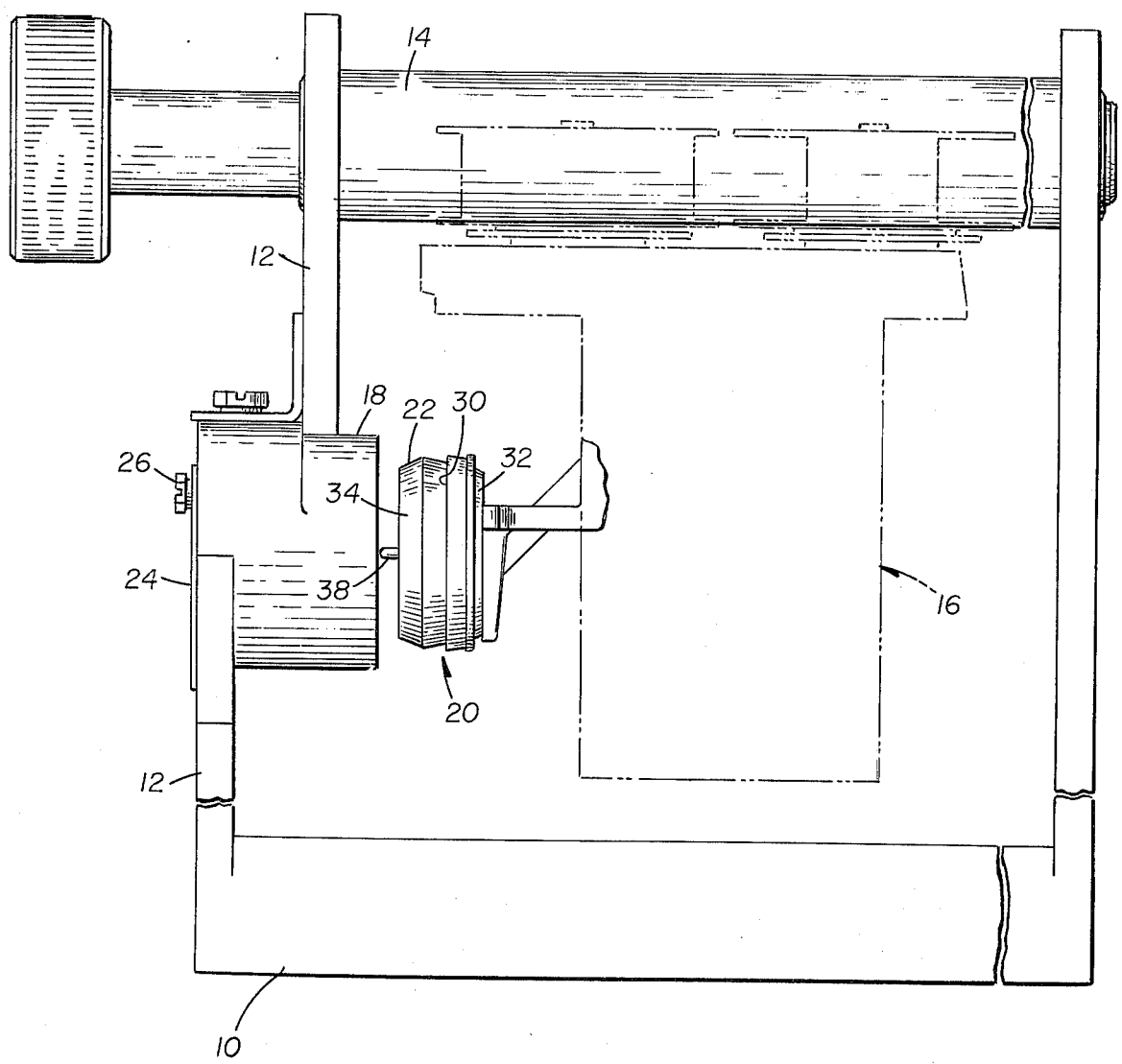
FIG. 1 is an elevational view of a teleprinter in schematic form emphasizing the relative location of the piston and cylinder within the teleprinter.

Referring now to the drawings and more particularly to FIG. 1, there is shown in schematic form a teleprinter having a base 10 and a left side upright 12, a platen 14 rotatably mounted in the left side upright 12 and extending across the printer. A carriage 16 containing the mechanism to control printing, ink ribbon, ribbon feed, etc., is mounted for translation from left to right and return across the printer in front of the platen 14. The advance from left to right of the carriage 16 is controlled by an advancing ratchet not shown. When the ratchet is released, the carriage 16 moves to the left under the influence of a spring also not shown. Since the spring must be strong enough to move the carriage 16 to the left expeditiously and against varying loads including lubricants that have thickened with age, the carriage 16 will excelerate rather rapidly to the left reaching a high speed as it reaches the left-hand margin of the platen 14. In order safely to decelerate the carriage 16 near the left-hand margin, a dashpot cylinder 18 is mounted on the left side upright 12. A dashpot piston 20 is mounted on the carriage 16 and generally aligned with the axis of the cylinder 18. In accordance with the abovementioned Sim patent, the piston 20 is slidably mounted on the carriage 16 such that the axis of the piston can be adjusted in a direction perpendicular to the axis of the cylinder 18. Additionally, there is an internal camming surface (not shown in FIG. 1) at the entrance of the cylinder 18 and a corresponding camming surface 22 on the face or near the face of the piston 20. These two camming surfaces cooperate as the piston nears the entrance to the cylinder 18 to translate the piston 20 in a direction to center the piston 20 with respect to the cylinder 18. The details of this mounting and camming action are more fully described in the abovementioned Sim patent.

In a dashpot system, the damping afforded by the dashpot is related to the ease with which the damping fluid can exit the compression chamber between the face of the piston and the closed end of the cylinder. In the case of most common dashpot damping systems, the fluid is air. The more readily air can escape from this compression chamber, the less damping is afforded. In order to regulate the ease with which the air can exit from the cylinder, an opening (not shown in FIG. 1) is provided in the closed end of the cylinder 18. In order to adjust the area of this opening, a lever 24 is mounted on the outside of the cylinder 18 with a single screw 26 such that the lever 24 is frictionally movable about the screw 26 so as to cover a greater or lesser area of the air release opening in the end of the cylinder 18.

However, in most cylinders, the outside diameter of the piston does not exactly seal the inside surface of the cylinder. Due to manufacturing tolerances on the dimension of the inside diameter of the cylinder and the outside diameter of the piston, a significant gap will usually exist between the piston and the cylinder. It is well known that flexible seals that press between the outer diameter of the piston and the inner diameter of the cylinder can be used to accommodate and fill this variable space that is of necessity provided between a rigid piston and a rigid cylinder. U.S. Pat. No. 2,702,396, granted on Feb. 22, 1955 to A. P. Marka discloses such a sealing cup. However, such sealing cups are usually biased strongly against the inside surface of the cylinder. However, the present cylinder is intended normally to reside outside of the cylinder and to enter the cylinder at each operation of the dashpot. Therefore, a sealing cup or ring is not generally feasible since the piston must move to accommodate and to enter the cylinder on each operation. A sealing ring flexible enough to accommodate this would not be rigid or strong enough to provide a sure firm seal and would simply permit air to blow past and thus provide an unreliable amount of damping. Also the bicycle pump piston does not lend itself to ready entrance to a cylinder. Therefore, the piston of the Sim patent was left without a sealing ring or cup.

Figure 2:
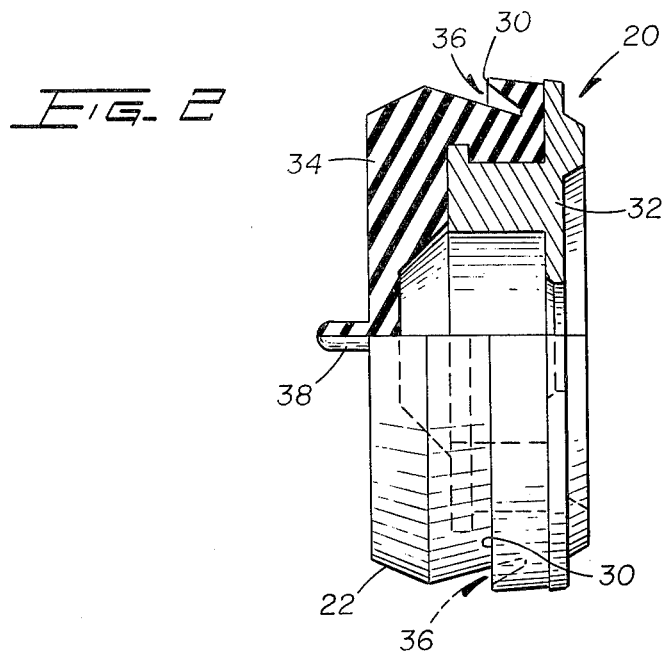
FIG. 2 is a side view, half in section of a piston having a flexible sealing ring in accordance with the preferred embodiment.

Referring now to FIG. 2, there is shown an embodiment of a piston which provides a sealing ring or cup that is flexible enough to readily enter the cylinder 18 and yet when inside of the cylinder 18 tightly seals against its internal surface. The bottom half of FIG. 2 is a side view of such a piston. The top half of FIG. 2 shows a cross sectional view through the center of the piston. The piston comprises a metal body 32 which is mounted to the movable carriage in accordance with the teaching of the Sim patent. A flexible cap 34 is mounted on metal body 32. The flexible cap 34 is preferably made of a rubber or plastic material such as polyurethane. The flexible cap 34 has a camming surface 22 which is the camming surface 22 of the piston 20 in FIG. 1. Towards the rear of the piston 20 and at the very rear of the flexible cap 34 is a cantilevered sealing ring 30 which projects forward towards the front of the piston. The static outer diameter of the sealing ring 30 is slightly larger than the inside diameter of the cylinder. The ring 30 is sufficiently rigid to maintain its diameter under most circumstances. However, the flexible cap 34 has a deep undercut area 36 which facilitates the exceptions to the rigidity of the sealing ring 30. The undercut 36 defines the cantilever position of the sealing ring 30 and promotes sufficient flexibility in a radial direction with respect to the piston 20 to allow the ring 30 to bend radially inward as it enters the cylinder 18. The undercut 36 also provides an air pressure surface which will be explained further in connection with FIG. 3.

A forward projection 38 is provided on the front surface of the piston 20 about the axis thereof. The purpose of this projection 38 will also be described in connection with FIG. 3.

Figure 3:
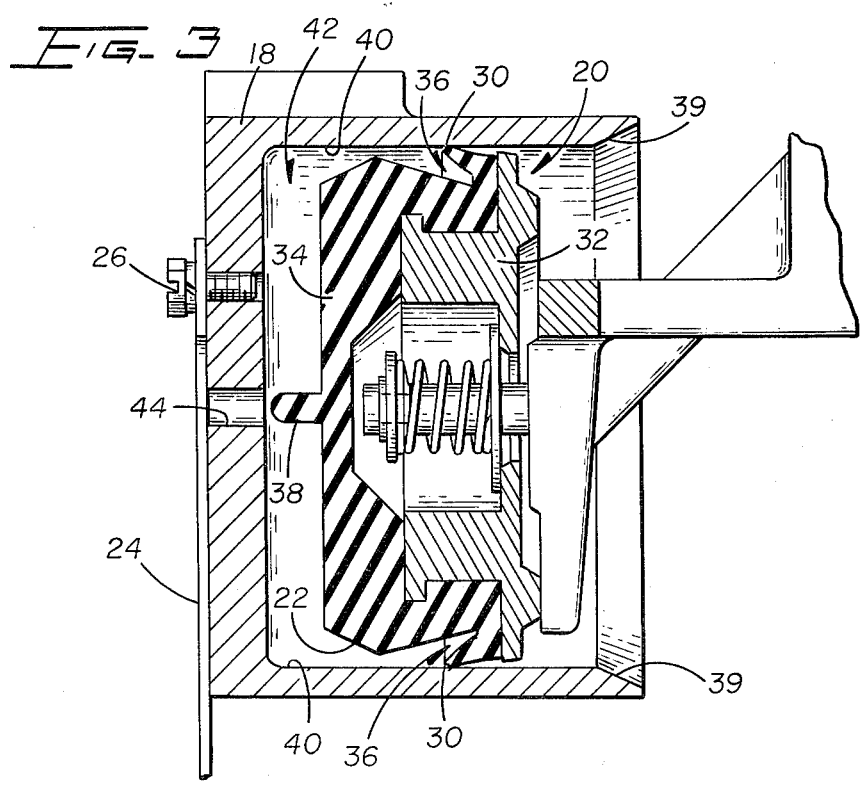
FIG. 3 is a cross-sectional drawing of the piston within a dashpot cylinder.

Referring now to FIG. 3, the piston 20 is shown in its operative position within the cylinder 18. At the position shown in FIG. 3, the sealing ring 30 has been cammed radially inwardly by the camming surface 39 at the open end of the cylinder and bears lightly against the internal surface 40 of the cylinder 18. It must be remembered that in the position shown in FIG. 3 the piston will be moving rapidly to the left with respect to the cylinder 18. Therefore, there will be considerable air pressure within the compression chamber designated by the reference number 42. At this point that pressure chamber 42 is readily communicated past the forward end of the piston to the undercut 36 where this pressure is applied radially to the inside surface of the sealing ring 30 thereby strongly forcing the sealing ring 30 radially outwardly to press tightly against the internal surface 40 of the cylinder 18 in order to seal the internal surface 40 against the escape of air past the piston. Therefore, the only possible egress of this compressed air in the pressure chamber 42 is through the hole 44 formed at the axis in the closed end of the cylinder 18. This hole is partially covered by the adjusting lever 24 in accordance with the teaching of the Sim patent.

As the piston 20 reaches its leftmost extreme corresponding to the carriage reaching the left-hand margin in the teleprinter shown schematically in FIG. 1, the projection 38 enters the hole 44 and constricts it so as greatly to impede the escape of air from the pressure chamber 42. This causes a rapid rise of pressure in the chamber 42, thus bringing the piston 20 rapidly to a final halt at the appropriate location at the left-hand margin. The projection 38 can be omitted if desired.

The piston 20 is resistant to jamming within the cylinder 18 because the only part of the piston 20 which touches the cylinder 18 is a very flexible sealing ring 30. Therefore, even though the axis of the piston 20 might not be exactly in line or even parallel with the axis of the cylinder 18, this slight cocking of the piston 20 will be unimportant since the sealing ring 30 is sufficiently flexible to accommodate slight variations in angle or dimension without undue forces and pressures. The sealing force of the sealing ring 30 is provided only by the internal pressure generated by the decelerating action of the dashpot. Therefore, it is virtually impossible with normal tolerances of manufacture for the piston 20 to jam in the cylinder 18 due to being slightly cocked in its mounting on the carriage 16.

Although only one specific embodiment of the invention is shown in the drawings and described in the foregoing specification, it will be understood that invention is not limited to the specific embodiment described, but is capable of modification and rearrangement and substitution of parts and elements without departing from the spirit and scope of the invention.

What is claimed is:

1. An apparatus for damping the return shock between a pair of first and second elements that are moved out of engagement and returned into engagement comprising:
   a dash pot cylinder carried on the first element having an internal cylindrical surface of a predetermined diameter,
   a dash pot piston on said second element having an annular sealing member projecting in a cantilever fashion generally outwardly from said piston and toward said cylinder, said sealing member displaying a first surface toward said cylinder,
   said cylinder defining an outwardly tapered camming surface continuous with the inner surface of said cylinder and extending outwardly therefrom and disposed toward said piston sealing member, the maximum diameter of said tapered surface being more than the maximum diameter of said sealing member so as to facilitate entrance of said piston into said cylinder and serving to cam said piston and cylinder into mutual axial alignment, said sealing member being constructed of a material exhibiting sufficient rigidity to retain said cantilever portion relatively close to the sides of said piston and exhibiting sufficient flexibility to permit entrance of said sealing member into said cylinder and deflect outwardly so as to seal a gap between the piston and the cylinder, said cylinder containing an operative fluid reacting upon said sealing member first surface to force said cantilever portion away from said piston thereby insuring contact of said sealing member with the walls of said cylinder, said cylinder including a fluid exit orifice and said piston having a projection extending from the end thereof oriented to enter said orifice near the terminal end of the piston entrance to said cylinder so as to increase the constriction of said fluid.

2. The apparatus of claim 1 which further includes means for selectively adjusting the constriction of the fluid within said cylinder to allow adjustment of the freedom of movement of said piston within said cylinder.

* * * * *